(12) United States Patent  (10) Patent No.: US 8,725,146 B2
Burgess  (45) Date of Patent: May 13, 2014

(54) METHOD OF REGISTERING A LOCATION OF AN ACCESS TERMINAL WITHIN A FEMTO NETWORK WITH A MACRO NETWORK, AND ASSOCIATED APPARATUSES

(75) Inventor: John K. Burgess, Morristown, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/213,679

(22) Filed: Aug. 19, 2011

(65) Prior Publication Data

US 2012/0184273 A1 Jul. 19, 2012

Related U.S. Application Data

(60) Provisional application No. 61/432,356, filed on Jan. 13, 2011.

(51) Int. Cl.
*H04W 4/00* (2009.01)
(52) U.S. Cl.
USPC ............. 455/435.1; 455/435.2; 455/448; 455/449; 455/456.1; 455/456.5

(58) Field of Classification Search
USPC .............. 455/435.1, 435.2, 448, 449, 456.1, 455/456.5
See application file for complete search history.

(56) References Cited

U.S. PATENT DOCUMENTS

| 2009/0097448 | A1* | 4/2009 | Vasudevan et al. | 370/331 |
| 2010/0077459 | A1* | 3/2010 | Mahdi et al. | 726/4 |
| 2010/0150071 | A1* | 6/2010 | Takubo | 370/328 |
| 2010/0208701 | A1* | 8/2010 | Tinnakornsrisuphap et al. | 370/331 |
| 2011/0177836 | A1* | 7/2011 | Iwata | 455/507 |
| 2012/0015655 | A1* | 1/2012 | Lee | 455/435.1 |
| 2012/0094665 | A1* | 4/2012 | Soliman et al. | 455/435.1 |

* cited by examiner

*Primary Examiner* — Charles Appiah
*Assistant Examiner* — Jaime Holliday
(74) *Attorney, Agent, or Firm* — Harness, Dickey & Pierce

(57) ABSTRACT

In one embodiment, the method of registering a location of an access terminal within a Femto network with a Macro network includes sending, by a Femto in the Femto network, a message to the Macro network. The message includes a first indicator, a second indicator and an address of the Femto. The first indicator indicates the access terminal. The second indicator indicates to register the Femto address in association with the access terminal.

16 Claims, 13 Drawing Sheets

Transition 2 (and Transtion 4) – State 1 → State 2 (State 2 → State 2)

Transition 3 — State 2 → State 1

Transition 5 (State 2 → State 3)

Transition 6 (State 3 → State 3)

Transition 7 (State 3 → State 1)

Transition 8 (State 1 → State 3)

New Session At Femto cell

Transition 6 (State 3 → State 3) – Prior Session

Transition 7 — (State 3 → State 1) — Prior Session

Transition 8 (State 1 → State 3) – Prior Session

Macro RNC A13 IP Address Synchronization (Set)

Macro RNC A13 IP Address Synchronization (Clear)

METHOD OF REGISTERING A LOCATION OF AN ACCESS TERMINAL WITHIN A FEMTO NETWORK WITH A MACRO NETWORK, AND ASSOCIATED APPARATUSES

PRIORITY INFORMATION

This application claims priority on Provisional. Application 61/432,356 filed on Jan. 13, 2011, the entire contents of which are hereby incorporated by reference.

BACKGROUND OF THE INVENTION

Heterogeneous networks (HetNets) are now being developed wherein cells of smaller size are embedded within the coverage area of larger Macro cells, primarily to provide increased capacity in targeted areas of data traffic concentration. Such heterogeneous networks try to exploit the spatial variations in user (and traffic) distribution to efficiently increase the overall capacity of the wireless network. Those smaller-sized cells are typically referred to as Pico Cells or Femto Cells, and for purposes of the description herein will generally be referred to as Femto Cells.

In 1×EVDO, when Femto Cells are embedded within the coverage area of a Macro cell, the Macro cell cannot always know or be able to find out the IP address of the Femto either for paging according to the A13 protocol or Femto-to-Macro session transfer without additional changes to the air interface for the access terminal (AT) (sometimes referred to as the mobile terminal). Known solutions will not work for current ATs. Additionally, the ATs could still be indiscriminately transferring their sessions between the Macro and Femto cells (and vice-versa), which would incur a large increase in processor occupancy of the Macro system.

SUMMARY OF THE INVENTION

At least one embodiment relates to method of registering a location of an access terminal within a Femto network with a Macro network.

One embodiment of the method includes sending, by a Femto in the Femto network, a message to the Macro network. The message includes a first indicator, a second indicator and an address of the Femto. The first indicator indicates the access terminal. The second indicator indicates to register the Femto address in association with the access terminal.

In one embodiment, the second indictor indicates to maintain a session of the access terminal with the Macro network if the session is currently handled by the Macro network.

For example, the second indicator may be a flag in the message. As another example, the second indicator may be a message identifier identifying the message as a registration message.

In one embodiment, the sending is performed in response to a trigger.

For example, the trigger may be receipt of a request for an access terminal identifier from the access terminal. As another example, the trigger may be transfer of a session for the access terminal to the Femto from another Macro network. As a further example, the trigger may be a connection request from the access terminal. As a still further example, the trigger may be a keep alive request from the access terminal, and the keep alive request requests that a session of the access terminal be maintained. In yet another example, the trigger may be transfer of a session for the access terminal to the Femto from another Femto.

In another embodiment, the method includes receiving, at the Macro network, a message from the Femto. The message includes a first indicator, a second indicator and an address of the Femto. The first indicator indicates the access terminal, and the second indicator indicates to register the Femto address in association with the access terminal. In one embodiment, the second indictor may also indicate to maintain a session of the access terminal with the Macro network if the session is currently handled by the Macro network.

In one embodiment, the method further includes storing, at the Macro network, the Femto address in association with an identifier of the access terminal; and sending, by the Macro network, a registration response message to the Femto.

At least one embodiment relates to a Femto.

In one embodiment, the Femto is configured to send a message to a Macro network. The message includes a first indicator, a second indicator and an address of the Femto. The first indicator indicates the access terminal, and the second indicator indicates to register the Femto address in association with the access terminal.

BRIEF DESCRIPTION OF THE DRAWINGS

The present invention will become more fully understood from the detailed description given herein below and the accompanying drawings, wherein like elements are represented by like reference numerals, which are given by way of illustration only, and thus, are not limiting of the present invention and wherein:

FIG. 2 illustrates a state diagram of the possible Femto/Macro session states for an AT.

DETAILED DESCRIPTION OF THE EMBODIMENTS

Figure 1:
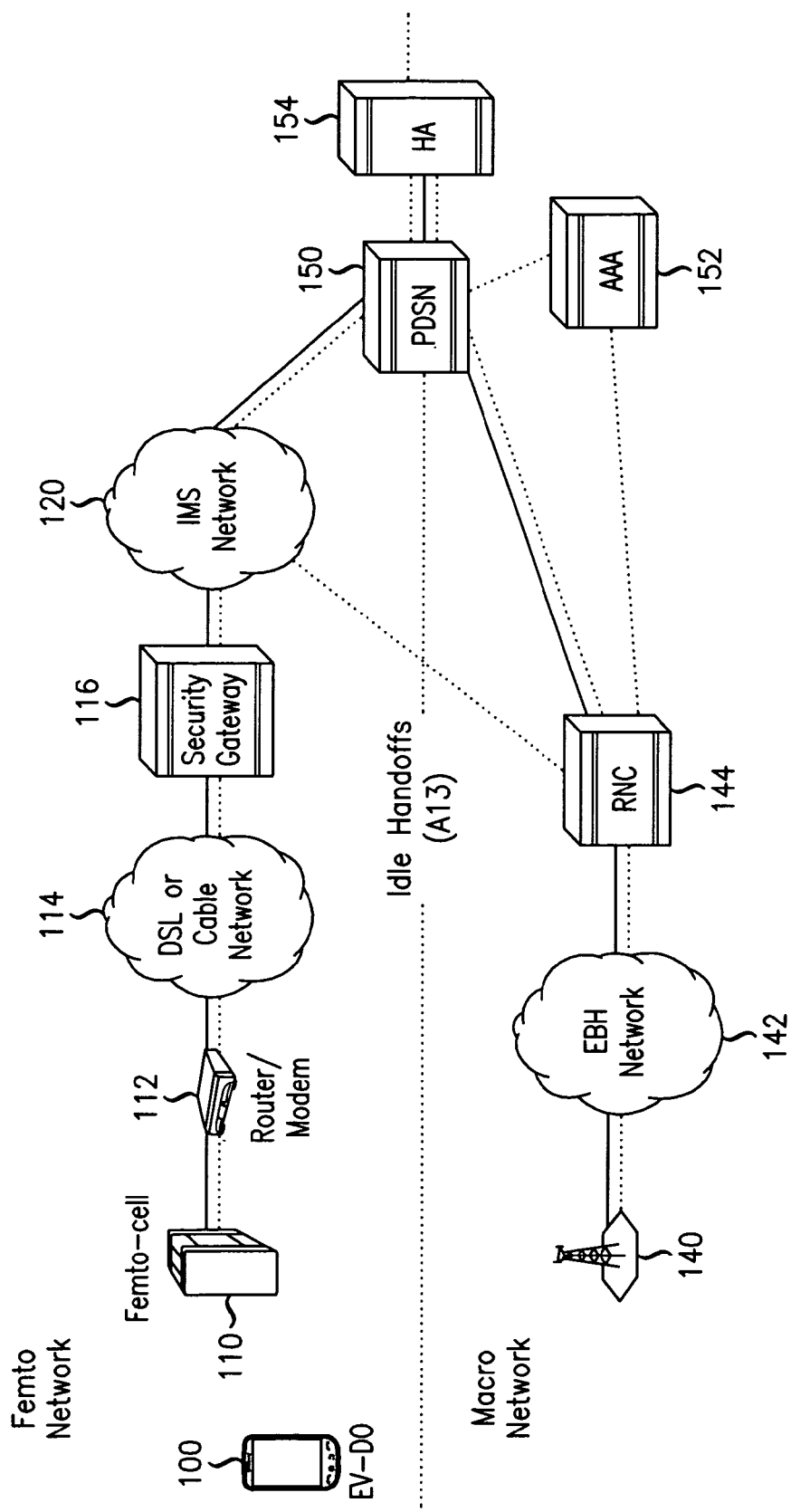
FIG. 1 illustrates a Macro cell/small cell architecture according to an embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, may be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in, some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Architecture

FIG. 1 illustrates a Macro cell/small cell architecture according to an embodiment. In particular, FIG. 1 shows an architecture where the Macro cell operates according to the 1×EVDO standard and the small cell is a Femto cell. However, it will be appreciated that the invention is not limited to these particular implementations.

As shown, a Femto cell 110 may communication with an access terminal (AT) 100. The Femto cell 110 may be an EV-DO Femto cell that includes radio network controller functions. The Femto cell or Femto 110 communicates with an IMS network 120 via a router/modem 112, a DSL or cable network 114 and a security gateway 116.

As further shown, a Macro cell (e.g., Macro cell base station) 140, may communicate with the AT 100. In this example, the Femto cell 110 is located within the coverage area of the macro cell 140. The macro cell 140 may also communicate with a radio network controller RNC 144 via an Ethernet backhaul EBH network 142. Alternatively, the Macro cell and RNC functionality may both be resident at the macro cell 140. The RNC 144 communicates with the IMS network 120, a packet data serving node PDSN 150, and an authentication, authorization and accounting server AAA 152. The RNC may be referred to as the Macro RNC or simple the Macro. The PDSN 150 also communicates with the IMS network 120 and a home agent HA 154.

According to one embodiment, a new type of registration message is provided. For example, the new registration message may be a new message in the A13 protocol, a new A13 registration message. The new A13 registration message provides the A13 IP address of the Femto sending the A13 registration message. The A13 registration message also includes a flag that indicates that the A13 registration message is intended to register the IP address of the Femto with the Macro, or to indicate that the session is being transferred to the Femto and the Macro should make a note of the target IP address in case the AT requests a session transfer back to the Macro. It is possible that some Femtos may be in a location where more than one RNC-subnet can be seen, so the registration messages may be sent to more than one RNC in some conditions. A corresponding response message may be used to acknowledge the registration message. For example, an A13 registration response message may be added to allow for the Macro to acknowledge the registration message from the Femto.

In an alternative embodiment, the A13 registration message does not provide for both registration only and transfer. Instead, in this embodiment, the A13 registration message only provide for registration. Accordingly, in this embodiment, the flag is not necessary. Instead, the message indicator (not described above, but included in any message) indicates the message is registration message, and indicates that the A13 registration message is intended to register the IP address of the Femto with the Macro.

In yet another alternative embodiment, various standards provide for messages that may be vendor defined. Accordingly, one of these "open" messages may be vendor defined to serve as or include a registration message according to either of the embodiments described above.

Upon sending the registration message, the Femto may start a timer, which is deactivated if the response message is received. However, if the timer expires, the registration is resent. The Femto may be configured to resend the registration message and restart the timer a desired number of times.

State Diagram of Possible Configurations

Figure 2:
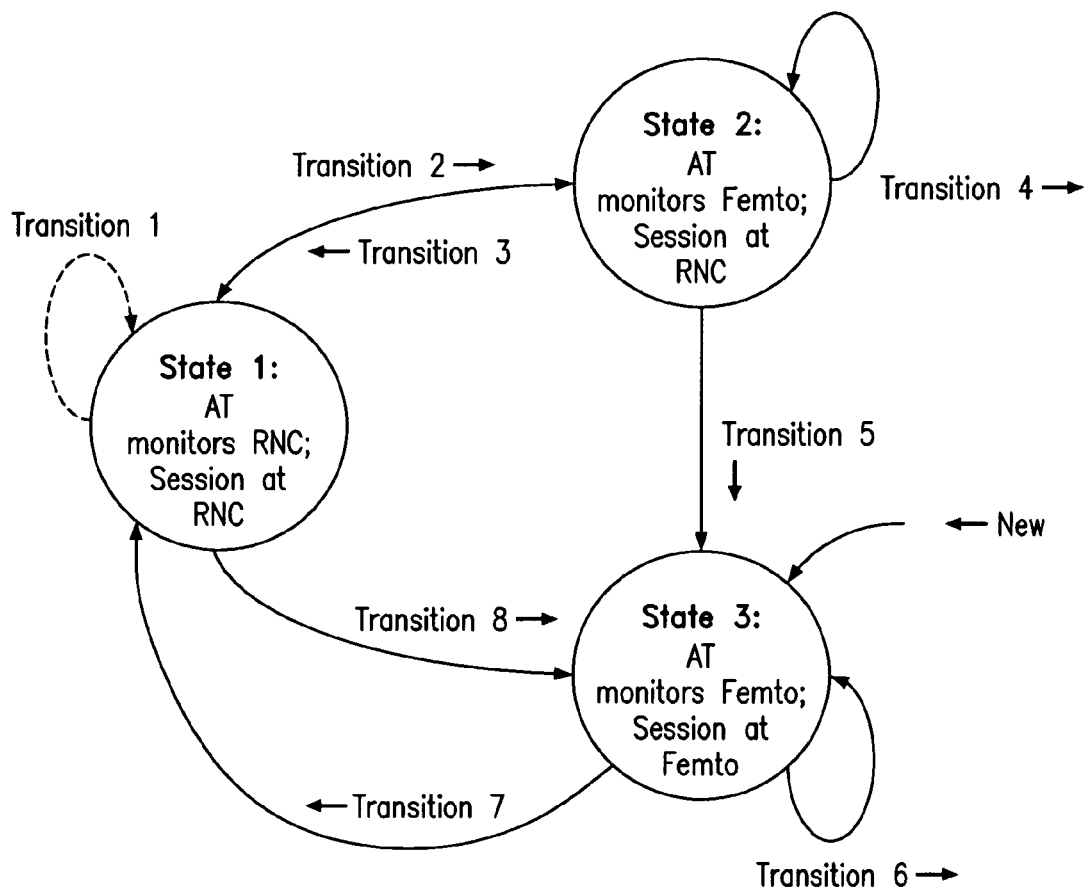

FIG. 2 illustrates a state diagram of the possible Femto/Macro session states for an AT. As will be appreciated, this state diagram applies to the AT 100 and the architecture described with respect to FIG. 1, but is not limited to this application. As shown in FIG. 2, there are three states:

State 1 (S1): Session on RNC, AT monitoring RNC,
State 2 (S2): Session on RNC, AT monitoring Femto (the state introduced by this invention), and
State 3 (S3): Session on Femto, AT monitoring Femto.

As further shown, there are eight transitions, plus an entry state:

Transition 1: S1→S1 (transfer between RNCs—covered by existing A13 protocol, no action needed),
Transition 2: S1→S2 ("straddle"/non-transfer to Femto),
Transition 3: S2→S1 ("straddle"/non-transfer return to Macro),
Transition 4: S2→S2 ("straddle"/non-transfer to other Femto),
Transition 5: S2→S3 (transfer to Femto; cannot go in opposite direction),
Transition 6: S3→S3 (transfer between Femtos),
Transition 7: S3→S1 (Femto to Macro transfer),
Transition 8: S1→S3 (Macro to Femto transfer—covered by existing A13 protocol, but action needed), and
New session at Femto (Action needed).

Prior to describing each transition, the two known methods of session transfer will first be described. Those two methods are the Color Code method of session transfer and the Prior Session method of session transfer.

In the Color Code method, the AT sees, after an idle hand-off, that the mask-specified upper part of a SectorID of the new sector is different from the same mask-specified upper portion of the AT's current UATI128 address, and is triggered to send a UATIRequest message to the AN to request a session transfer. The identity of the source of the session to transfer is contained in the MAC Layer header of the UATIRequest message, which contains the UATI032 of the session, which is made up of an 8-bit color code and a 24-bit session number. The target of the transfer, or recipient of the UATIRequest message, will take the 8-bit color code, which should be unique for the local area, and use that to look up the full A13 IP address of the session source. The target then follows standard A13 procedures to transfer the session from the source.

In the Prior Session method, the AT sees, after an idle hand-off, that the mask-specified upper part of the SectorID of the new sector is different from the same mask-specified upper portion of the AT's current UATI128 address, however the AT under its own, and unpublished, logic concludes that it is not sure that the color code would be unique. It is then triggered to send a UATIRequest message to the AN to request a new session. The MAC Layer header of the UATIRequest message contains the Random AT Identifier (RATI), instead of the UATI032. The target of the transfer, or recipient of the UATIRequest message, will set up a new session and assign it to the AT. The AT, once it has a new session, will use the Prior Session protocol to negotiate for its old session, and sends its UATI128 (an IPv6 address). In this case, however, standards do not specify any content of the UATI128 that will contain an address of the source of the session. All implementations for this method are, for the most part, proprietary, and may not work between vendors, unless both vendors have negotiated a common format. In the normal ALU implementation, the 32-bit A13 IP address is embedded in the UATI128, just above 24-bit session number. Then the target knows where to find the source of the session when the AT negotiates for prior session, and then follows standard A13 procedures to transfer the session from the source. The problem with the prior session method is that its use precludes the new "straddle" state or state 2, in which the AT monitors the Femto, but keeps its session at the RNC, as it creates a new session at the Femto. Actions, as specified later herein, should be taken to manipulate the contents of the SectorID and Masks such that the AT will be blocked from using this method of session transfer.

The Color Code method can be used for all the transitions discussed above, but the Prior Session Method can only be used for transitions 1, 6, 7 & 8, since there is no way to reach State 2 with the Prior Session Method of idle session transfer. Transition 1 is completely defined by the existing A13 protocol, and will not be covered. All other transitions will need some actions on the part of the Femto to ensure that the local Macro knows where the AT is and where to either page the AT (State 2) or where to request information to complete the session transfer (Transition 7).

The "straddle" case (State 2) is where the RNC grouping UATI (Unicast Access Terminal Identifier) Assignment method (described below) is used to keep the AT from getting into an infinite UATIReq/UATIAssign loop.

Flow Diagrams for the Color Code Method of Idle Session Transfer

FIGS. 3-9 provide a set of flow diagrams that depict the interaction between the AT, the radio network RN (e.g., the Macro RNC), and the Femto for transitions 2 through 8 and a new session, respectively. As will be appreciated, these methods of state transition may be applied to the architecture of FIG. 1

Transitions 2 and 4

Figure 3:
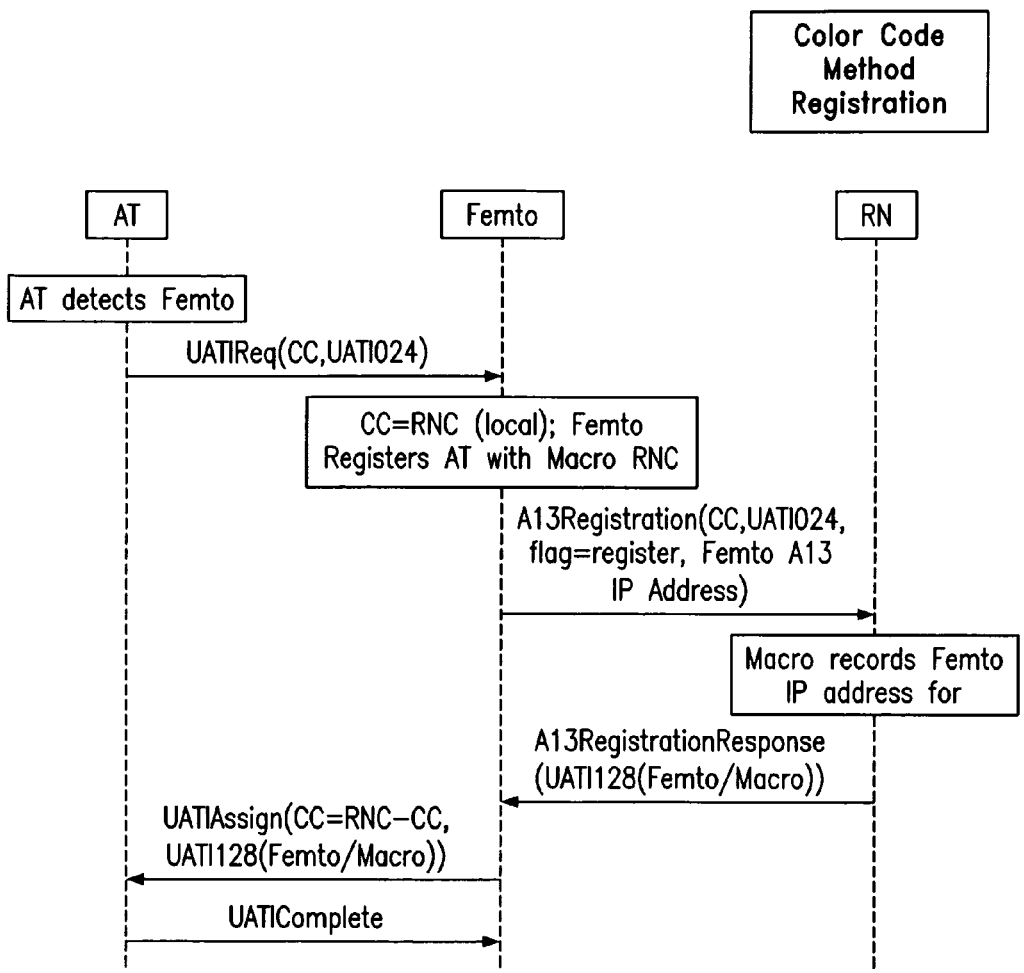
FIG. 3 illustrates a flow diagram for transitions 2 and 4.

FIG. 3 illustrates the flow diagram for transitions 2 and 4. As shown, the AT detects a new Femto and sends the Femto a UATIReq message that identifies the color code CC of the Macro sub-net and the UATI024 (i.e., a representation the lower 24 bits of the UATI assigned to the AT by the radio network). The upper portion of the UATI128 assigned to the AT is the portion of the Femto's SectorID covered by a mask, and the lower portion of the UATI128 is the part of the original Macro UATI128 segment below the mask (i.e., a representation of the lower 128 bits of the UATI assigned to the AT by the Macro). The upper part of SectorID has information that identifies the Femto uniquely within a local area such that the UATIReq will trigger when the AT encounters a different Femto.

The Femto has been configured with the color code CC of the Macro(s) and their corresponding A13 IP address(es). In response to receiving the UATIReq from the AT, where the color code CC matches that of an associated Macro, the Femto sends the radio network RN (e.g., the Macro and/or the RNC via the Macro) the new registration message. For purposes of explanation only, the new A13 registration message will be used as the example of the new registration message. As indicated above, the A13 registration message includes the color code CC in the UATIReq from the AT, the UATI024, the register flag set to register and the A13 IP address of the Femto. As will be appreciated in the alternative embodiments, the register flag may not be present.

The RN (e.g., the Macro or RNC) identifies the need to record the IP address of the Femto based on the set registration flag IP address itself, and records the Femto IP address for the AT in response to the A13 registration message. In the alternative embodiment, where the A13 registration message is not used for transfer and does not include the flag, the RN identifies the need to record the Femto IP address based on the message identifier identifying the message as a registration message. Throughout this disclosure, the RN may be interchangeably referred to as the RNC, the Macro RNC or simply the Macro. The Macro identifies the AT and session based on the UATI024. The Macro also sends a registration response message, such as the A13 registration response message, to the Femto. As shown, the A13 registration response message may include a UATI128 for the AT to properly identify the AT. This allows the Femto to associate the A13 registration response message with the A13 registration request message for this AT. This new UATI128 includes upper bits of the SectorID that identify the Femto, and as such, the UATI128 is referred to as the UATI128 (Femto/Macro) in FIG. 3.

The Femto then sends a UATIAssign message to the AT. The UATIAssign message includes the UAT128 received in the A13 registration response message, the color code CC of the Macro (referred to as RNC-CC in FIG. 3.

In response, the AT sends a UATIComplete message, which ends the transition 2/4 procedure. As shown, the session is not actually transferred. After session "re-assignment", the CC of session is still set to the Macro's CC. Since the AT's session is still at the Macro, the only time the Femto would page the AT is if the Femto received an A13 Page message from the Macro.

For transition 4, even though it is a transition from one Femto to another, triggered by a change in the SectorID that is within the mask length, the procedure is as shown in FIG. 3. Since the CC of the session remains the Macro CC, as long as the Femto's upper bits of the SectorID above the mask are different then their Femto neighbors, then the AT will request a new UATI, providing the CC of the Macro, which triggers the same registration with the Macro. If the Femto's upper bits of the SectorID covered by the mask are the same, then the AT will not be triggered to send a UATIRequest. In this case any page messages will go to the initial Femto. The initial Femto would have to forward the page requests to all the Femtos of the Femto cluster (defined by the contiguous Femto coverage where UATIRequests from the AT are not triggered) in this case.

Transitions 3

Figure 4:
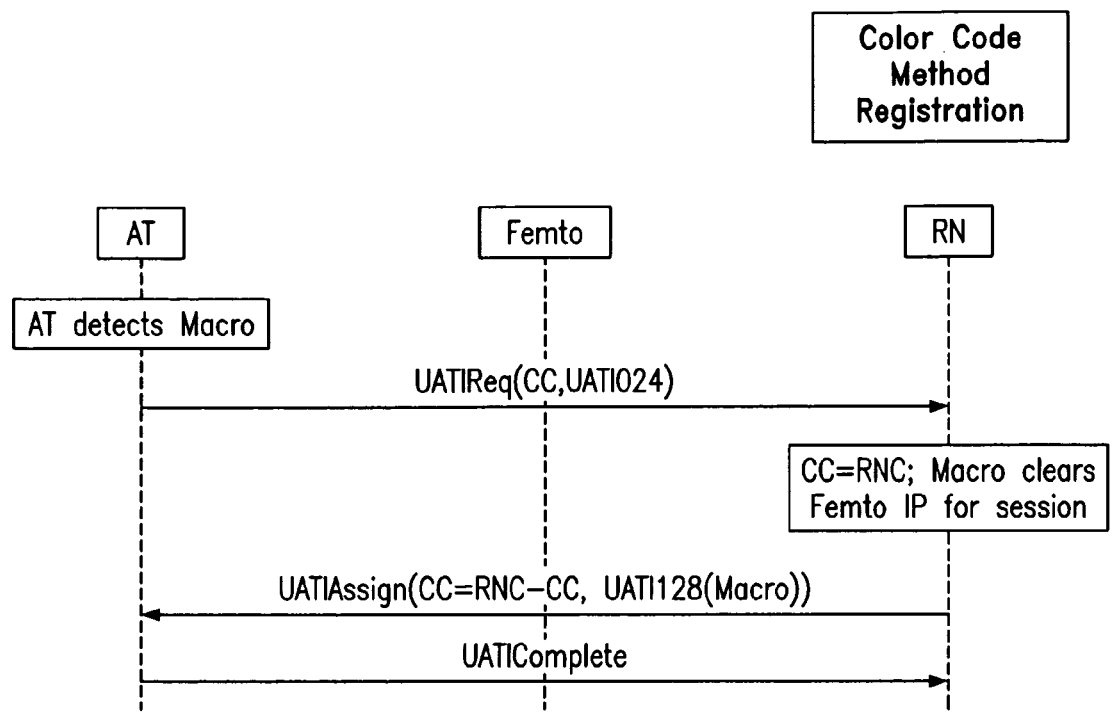
FIG. 4 illustrates a flow diagram for transition 3.

As shown in FIG. 4, if the AT detects the Macro and determines to monitor the Macro instead of the Femto (e.g., signal strength from Femto drops below a threshold, or the Macro signal strength exceeds an associated threshold), the AT sends a UATIReg to the RN. The UATIReg includes the CC and UATI024. The RN recognizes the AT and session based on the UATI024. In response, the RN clears the Femto IP address for this session (e.g., received in Transition 2 or 4). The RN then sends a UATIAssign message to the AT. The UATIAssign message includes the UATI128 and the color code CC. Because the UATI128 is for State 1 in which the Femto is no longer monitored, the UATI128 is referred to as UATI128 (Macro).

In response, the AT sends a UATIComplete message, which ends the transition 3 procedure. As will be appreciated, the session is not actually transferred, and the AT will get its original Macro UATI128 back, since it never actually transferred its session. Still further, the CC of session is still set to the Macro's CC.

Transition 5

Figure 5:
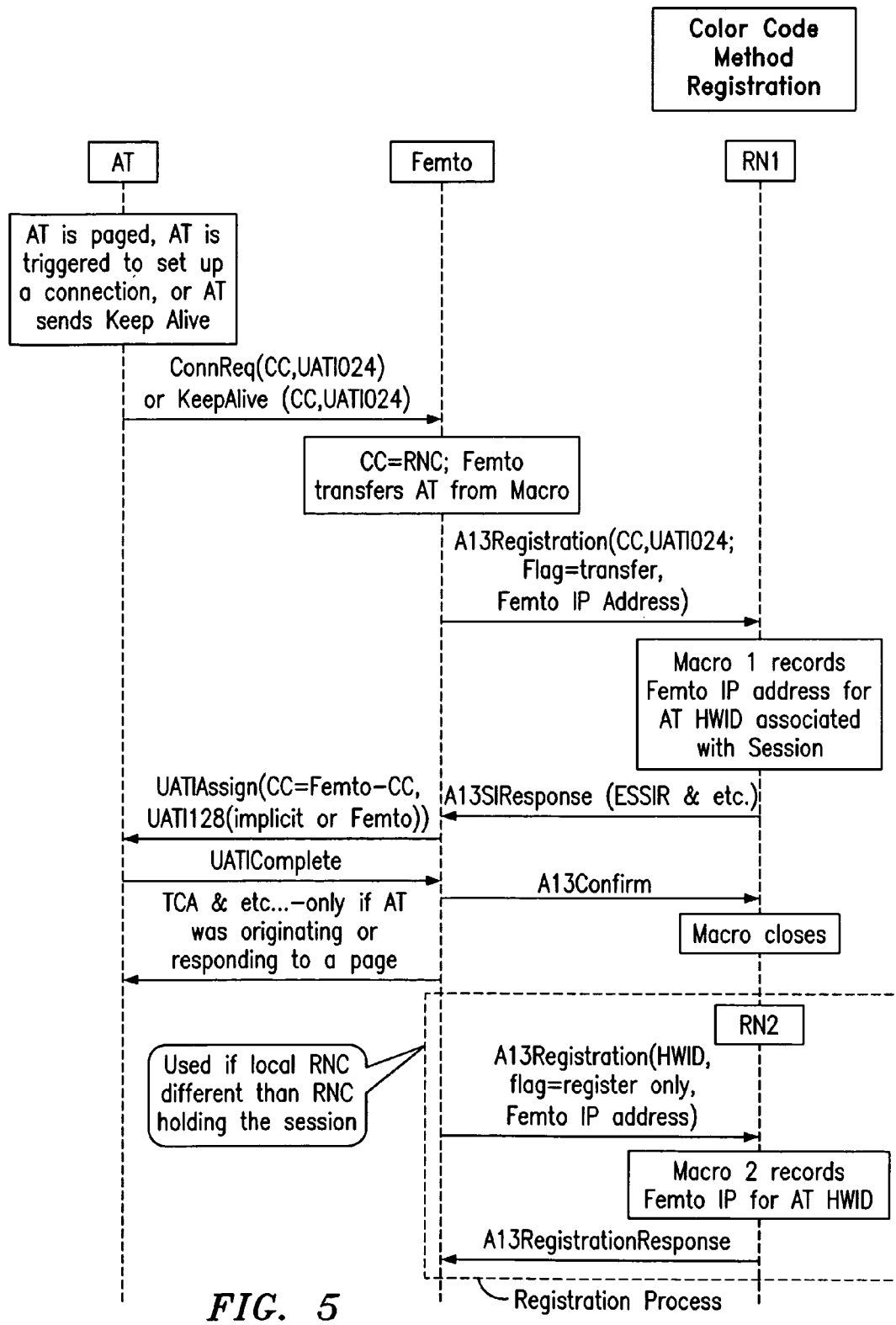
FIG. 5 illustrates a flow diagram for transition 5.

As shown in FIG. 5, if the AT is monitoring the Femto and the Macro needs to page the AT, the Macro knows where to send the A13 page message, since the Femto registered the AT but did not transfer the session. So, if the AT needs a connection (page response or origination) or if the AT sends a KeepAlive message, the session is now actually transferred to the Femto. As shown, in response to a page, the AT sends a connection request ConnReq that include the CC of the Macro and the UATI024. Alternatively, if the AT determines to send a KeepAlive message, a keep alive message including the CC of the Macro and the UATI024 is sent to the Femto. A KeepAlive message is sent if the session has not had active data transfer for a period of time, but the AT desires to maintain the session.

In response to either message, the Femto determines to transfer the session to the Femto, and sends an A13 registration message to the RN with a flag in the message set to "transfer." In the embodiment where the A13 registration message does not include the flag, then instead of sending an A13 registration message as described above, the Femto may send a normal and well-known A13 SI (session information) Request to the Macro handling the session.

In response, the Macro records the Femto IP address in association with the hardware ID of the AT, which is associated with the session. If the AT subsequently returns to the Macro and requests a session transfer, this is the IP address that will be used to request the session to be transferred. The Macro then sends an A13 SI response as is well-known regardless of whether an A13 registration message or A13 SI Request was received.

In response to the A13 SI response, the Femto sends an UATIAssign message to the AT. The UATIAssign message provides a color code of the Femto, and a UATI128 associated with the Femto. Namely, the UATI assigned to the AT has a SectorID using the current Femto SectorID. As a result of the UATIAssign message, the CC of the session is now the Femto's CC. An upper part of SectorID still has information that identifies Femto uniquely within local area such that a UATIReq will trigger when the AT encounters a different Femto.

The AT responds to the UATIAssign message with a UATI complete message, and the Femto, in response, sends an A13 confirm message to the RN. As a result, the Macro closes the session as the Macro.

The Femto will commence communication with the AT as a result of the page if this process was triggered by a page of the AT.

As further shown in FIG. 5, if the RN associated with the Femto is different than that originally handling the communication needs of the AT, then the Femto registers the session with the local RN associated with the Femto. Namely, the Femto sends an A13 registration message to the Macro(s) associated with the Femto. The A13 registration message includes a flag indication registration only, and also includes the hardware ID of the AT. Alternatively, the A13 registration message does not include the flag, but is identified as the registration message based on its message identifier or indicator. The receiving Macro(s) records the Femto IP address in association with the hardware ID of the AT, and responds with an A13 registration response.

Transition 6

Figure 6:
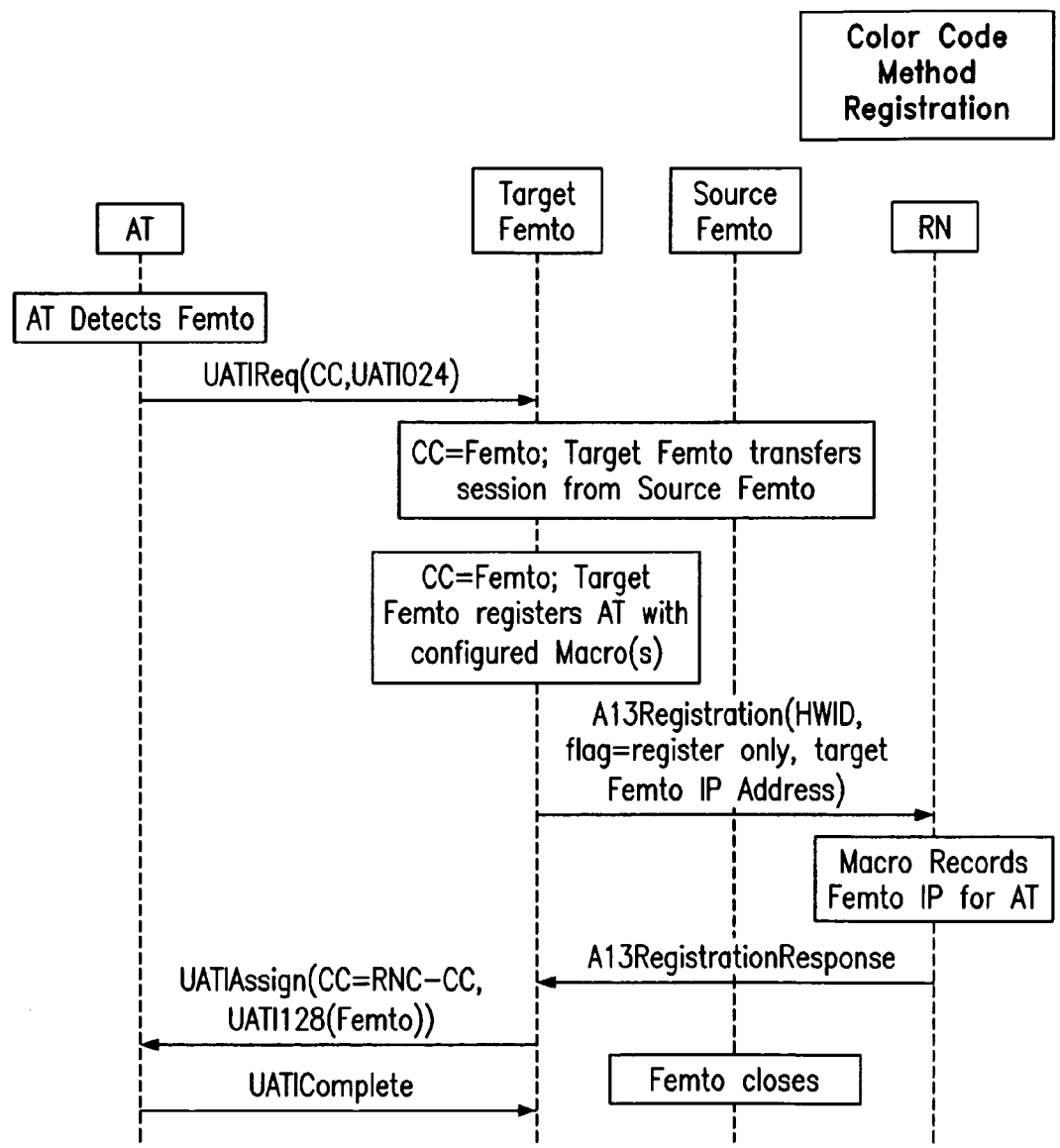
FIG. 6 illustrates a flow diagram for transition 6.

As shown in FIG. 6, if the AT has its session on a Femto and detects a different Femto, it will request a session transfer to the new Femto. Namely, the AT sends a UATIReq to the new or target Femto. The target Femto effects a transfer of the session from the original or source Femto in any well-known manner. Then, the new Femto will need to register the AT with a configured local Macro RNC such that the RNC will know which Femto to contact if the session needs to be transferred to the Macro. To accomplish this, the target Femto performs the same registration process as described above with respect to FIG. 3 except that the A13 registration message sent to the RN from the target Femto also includes the hardware ID of the AT.

Transition 7

When the AT has its session on the Femto, and detects the Macro system strong enough to trigger a session transfer, the AT will send a UATIReg message to the RN. The RN responds with a hardware ID request message that includes the CC and the UATI024 from the UATIReq message. The AT responds with a hardware ID response that includes the hardware ID (HWID) of the AT along with the CC and the UATI024.

Using the HWID, the RN access the Femto IP address for the Femto currently handing the session. As will be appreciated, the Macro RNC knows the address of the Femto to which it should be requesting the session be transferred from, due to the actions taken in the previous registration scenarios. The RN then sends an A13 SI Request including the UATI024 of the AT to the Femto having the accessed Femto IP address. The Femto sends an A13 SI response to the RN and the RN responds with an A13 confirm message. As a result, the Femto closes the session.

The RN then sends a UATIAssign message to the AT. The UATIAssign message includes the CC of the RNC associated with the Macro and further includes a UATI128 for the AT assigned by the Macro. The AT responds with a UATI Complete message.

Transition 8

Transition 8 is used when the AT registers with a Femto but indicates that a session is with a Macro RNC that is not one of the "local" RNCs (e.g. does not match a local Macro RNC Color Code). In this case the session at the source Macro still needs to be closed, but the Femto needs to forward the AT's location to the local RNC so, in case a subsequent transition 7 occurs to the local RNC, the local RNC knows the address of the Femto from which it should request the session be transferred.

Figure 8:
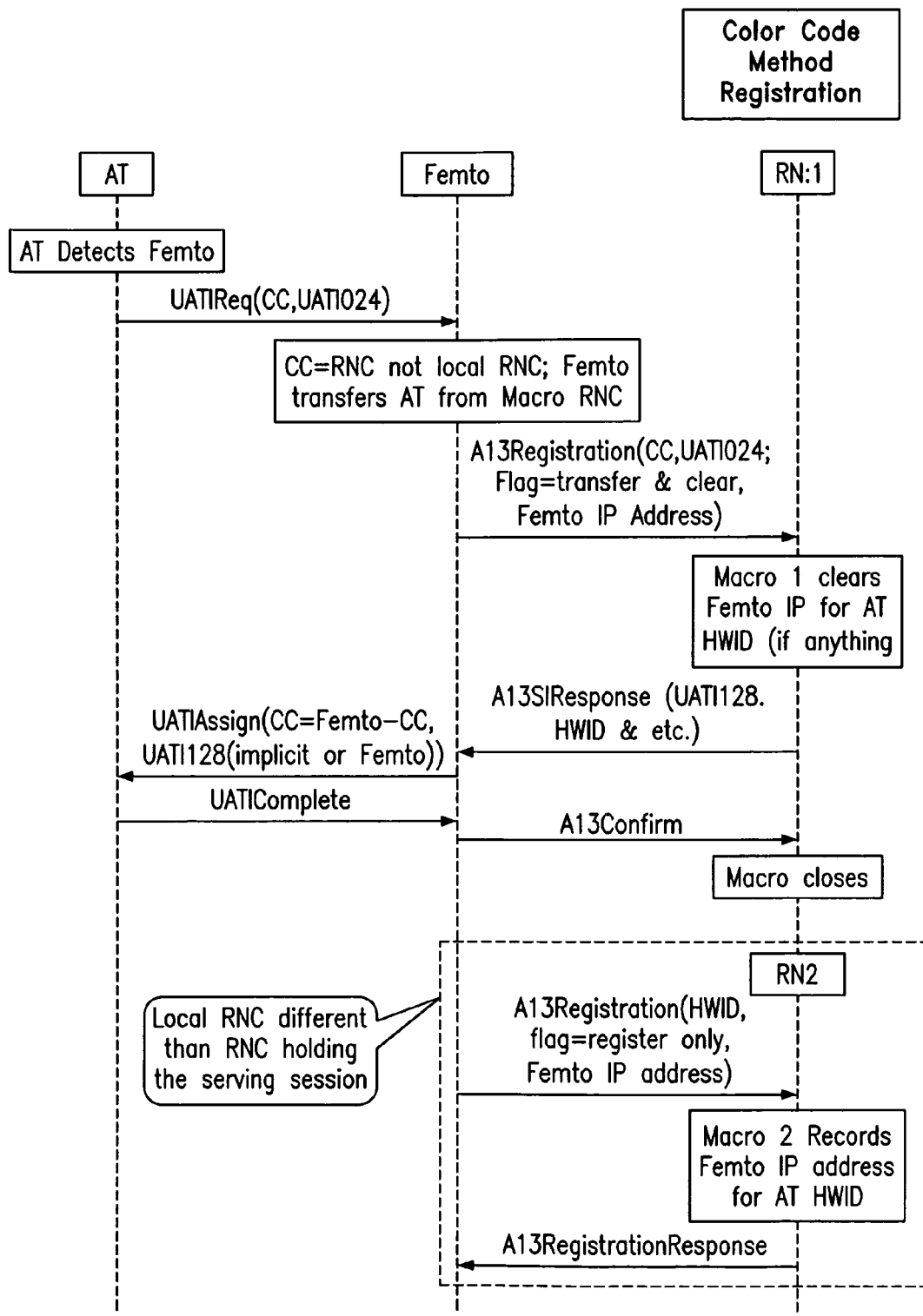
FIG. 8 illustrates a flow diagram for transition 8.

As shown in FIG. 8, the AT sends a UATIReq to the detected Femto. In response, the Femto detects that the CC in the UATIReq does not match that of a local RNC associated with Femto, and determines from this to transfer the AT from the current serving Macro. To accomplish this, the Femto sends an A13 registration message to the current serving RN. The A13 registration message includes a flag indication to transfer the session to the Femto and to clear or close the session at the current serving Macro. Alternatively, in the embodiment where the A13 registration message does not include the flag, an A13 SI Request message may be sent.

In response, the current serving Macro sends an A13 SI response message to the Femto and clears the Femto IP address associated with the AT, if such an association exists. The Femto, as a result, sends an UATIAssign message to the AT. The UATIAssign message provides a color code of the Femto, and a UATI128 associated with the Femto. Namely, the UATI assigned to the AT has a SectorID using the current Femto SectorID. As a result of the UATIAssign message, the CC of the session is now the Femto's CC. An upper part of SectorID still has information that identifies Femto uniquely within local area such that a UATIReq will trigger when the AT encounters a different Femto.

The AT responds to the UATIAssign message with a UATI complete message, and the Femto, in response, sends an A13 confirm message to the currently serving RN. As a result, the Macro closes the session as the Macro.

Next, the Femto registers the session with the local RN associated with the Femto. Namely, the Femto sends an A13 registration message to the Macro(s) associated with the Femto. The A13 registration message includes a flag indicating registration only, and also includes the hardware ID of the AT. As discussed above, alternatively, the A13 message does not include a flag. The receiving Macro(s) records the Femto IP address in association with the hardware ID of the AT, and responds with an A13 registration response.

New Session

Figure 9:
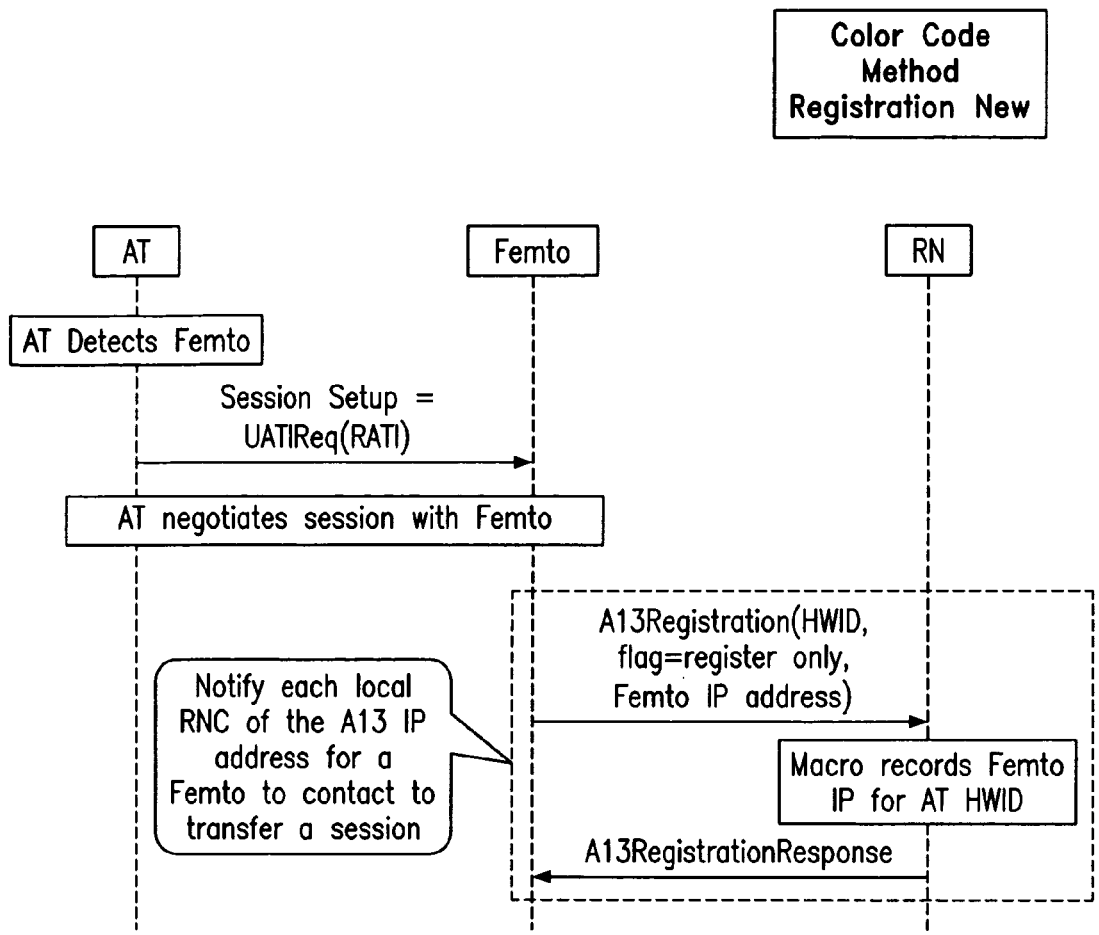
FIG. 9 illustrates a flow diagram for a new session.

For a new session, the AT first detects a Femto, and as shown in FIG. 9, performs a well-known session set up with the detected Femto. Note that in this case, just like that for Transition 8, the Femto now needs to forward the AT's location to the local RNC so, in case a subsequent transition 7 occurs to the local RNC, the local RNC knows the address of the Femto from which it should request the session be transferred. Accordingly, the Femto registers the session in the same manner described above with respect to FIGS. 5 and 8.

Flow Diagrams for the Prior Session Method of Idle Session Transfer

Unfortunately, the transitions to State 2 are not possible if the Prior Session method of idle transfer is used, since the AT sets up a new session on the target before it even negotiates for the transfer of its previous session, and this prevents the option of leaving the session at the Macro system until a local session is needed.

Figure 10:
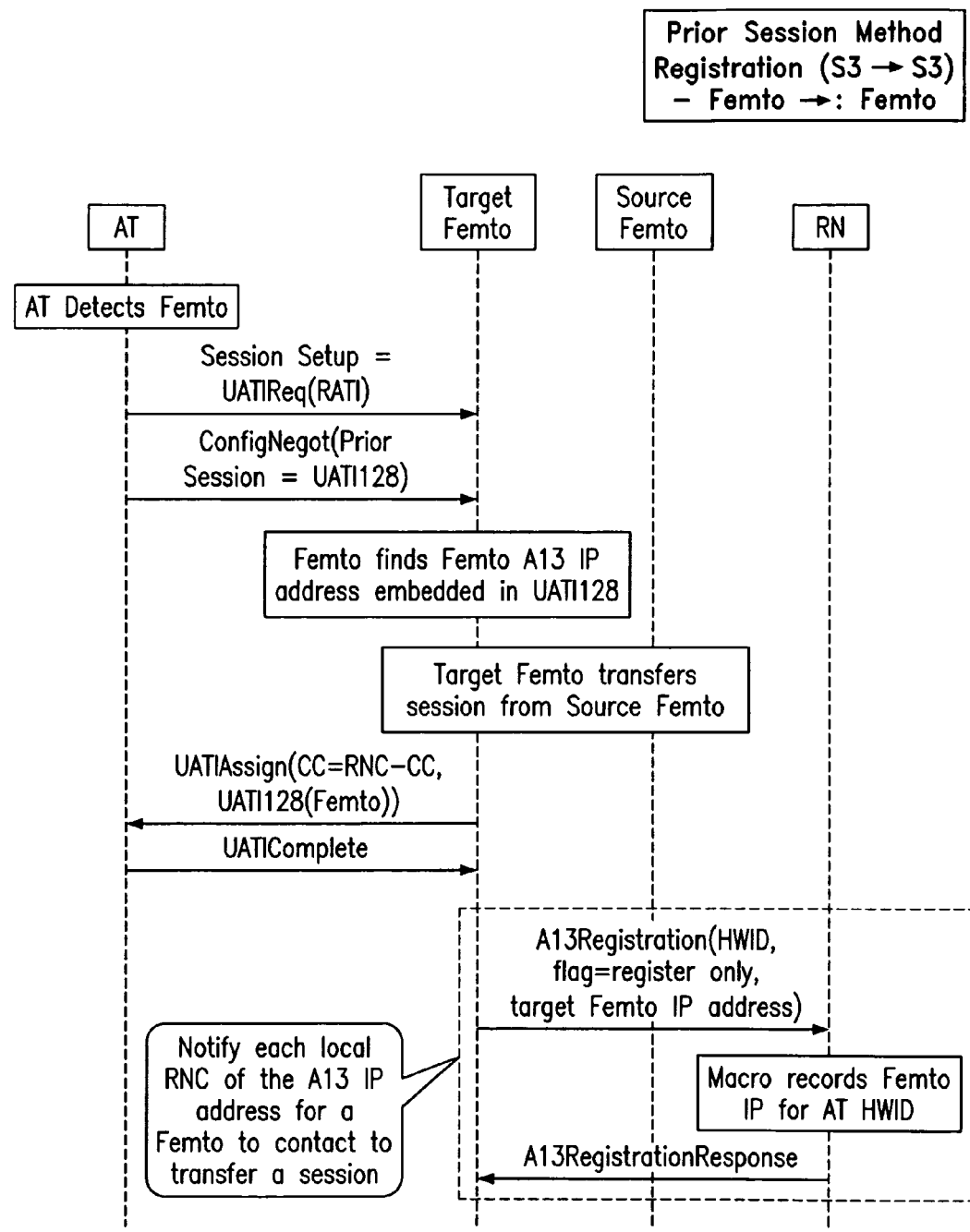
FIG. 10 illustrates another flow diagram for transition 6.
Figure 11:
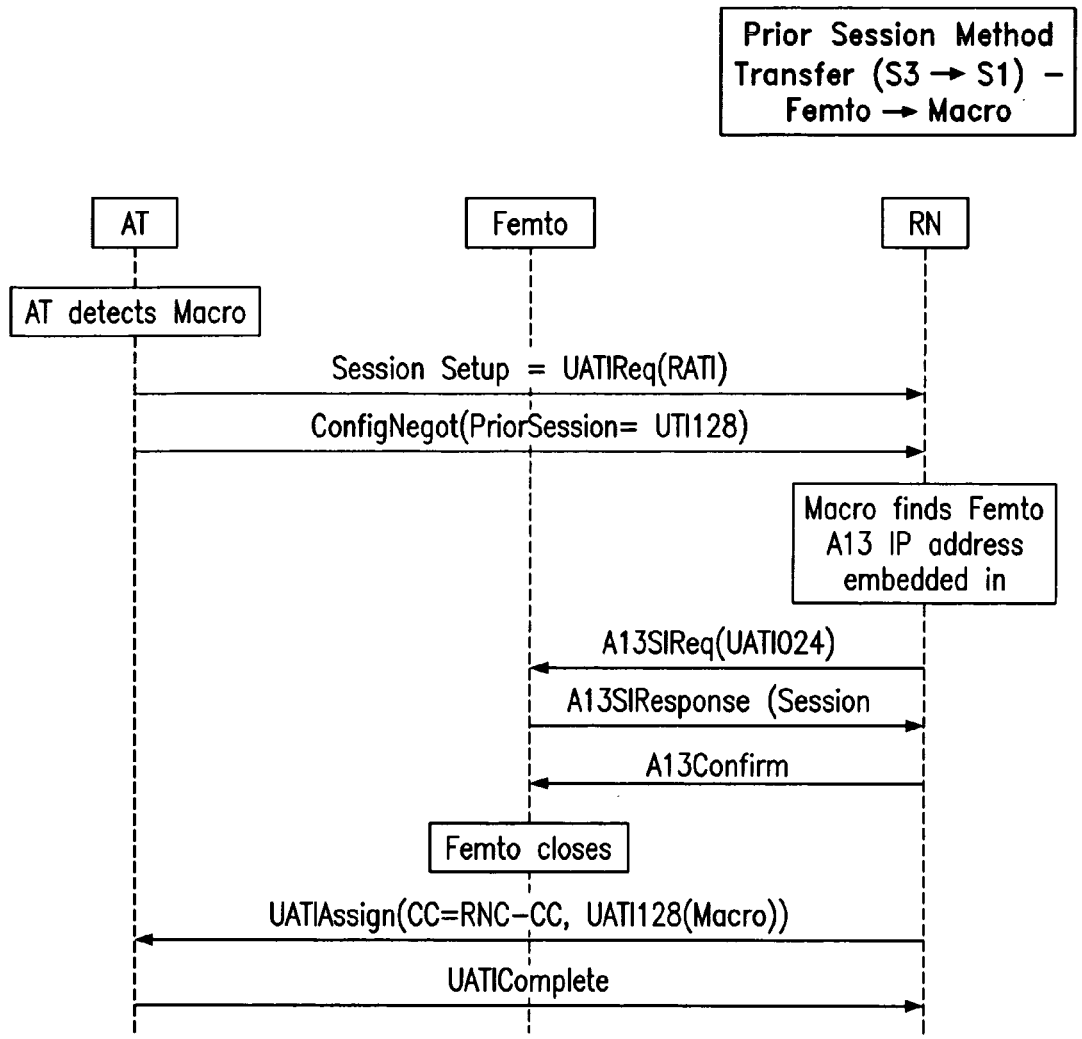
FIG. 11 illustrates another flow diagram for transition 7.
Figure 12:
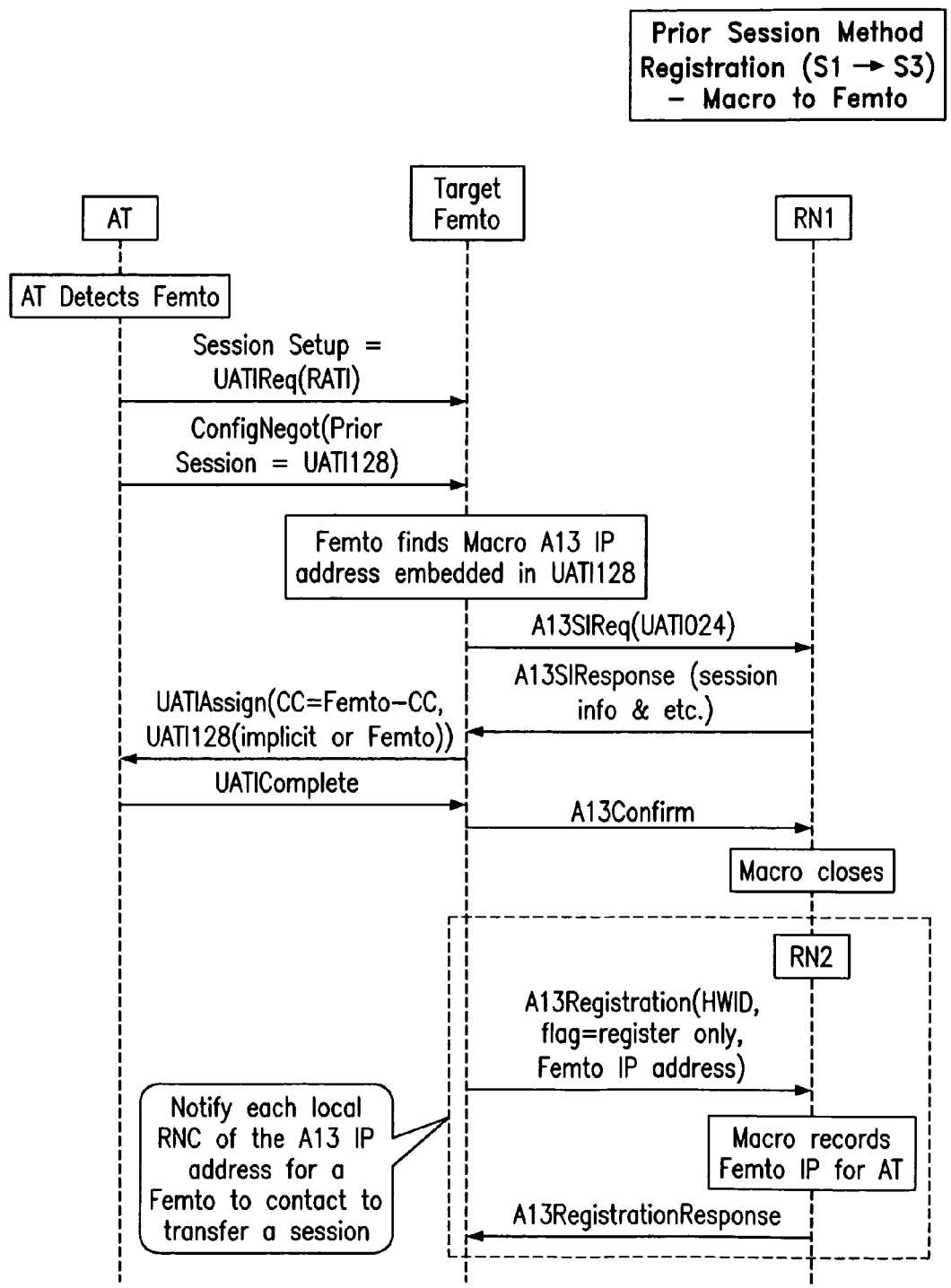
FIG. 12 illustrates another flow diagram for transition 8.

FIGS. 10-12 show how the Femto can still register with the local Macro even when the AT performs a Prior Session method of idle transfer, so that a subsequent Color Code method transfers will work. Only transitions 6, 7 & 8 are described, as the transitions to and from State 2 cannot work with the Prior Session method of idle session transfer.

Transition 6

As shown in FIG. 10, after the AT detects the new or target Femto, the AT initiates a session set up with the target Femto in the well-known manner. However, in this scenario, the target Femto may obtain the A13 IP address of the source Femto from an established location within the UATI128 sent by the AT during the session set up. The established location may be established as negotiated by the vendors in the handoff region. For example, the A13 IP address may be placed in the last 32 bits of the UATI104. If there is no information within the UATI128 that identifies the source Femto, it may not be able to identify the source Femto, but this is not necessarily fatal to the session transfer. Assuming the A13 IP address is obtained by the target Femto, the target Femto effects session transfer with the source Femto in any well-known manner.

Then, the target Femto sends a UATIAssign to the AT. The UATIAssig indicates the CC of Macro(s) associated with the target Femto and a UATI128 associated with the Femto. In response, the AT returns a UATI complete message.

Next, the target Femto performs the registration process with the Macro(s) associated therewith.

Transition 7

Figure 7:
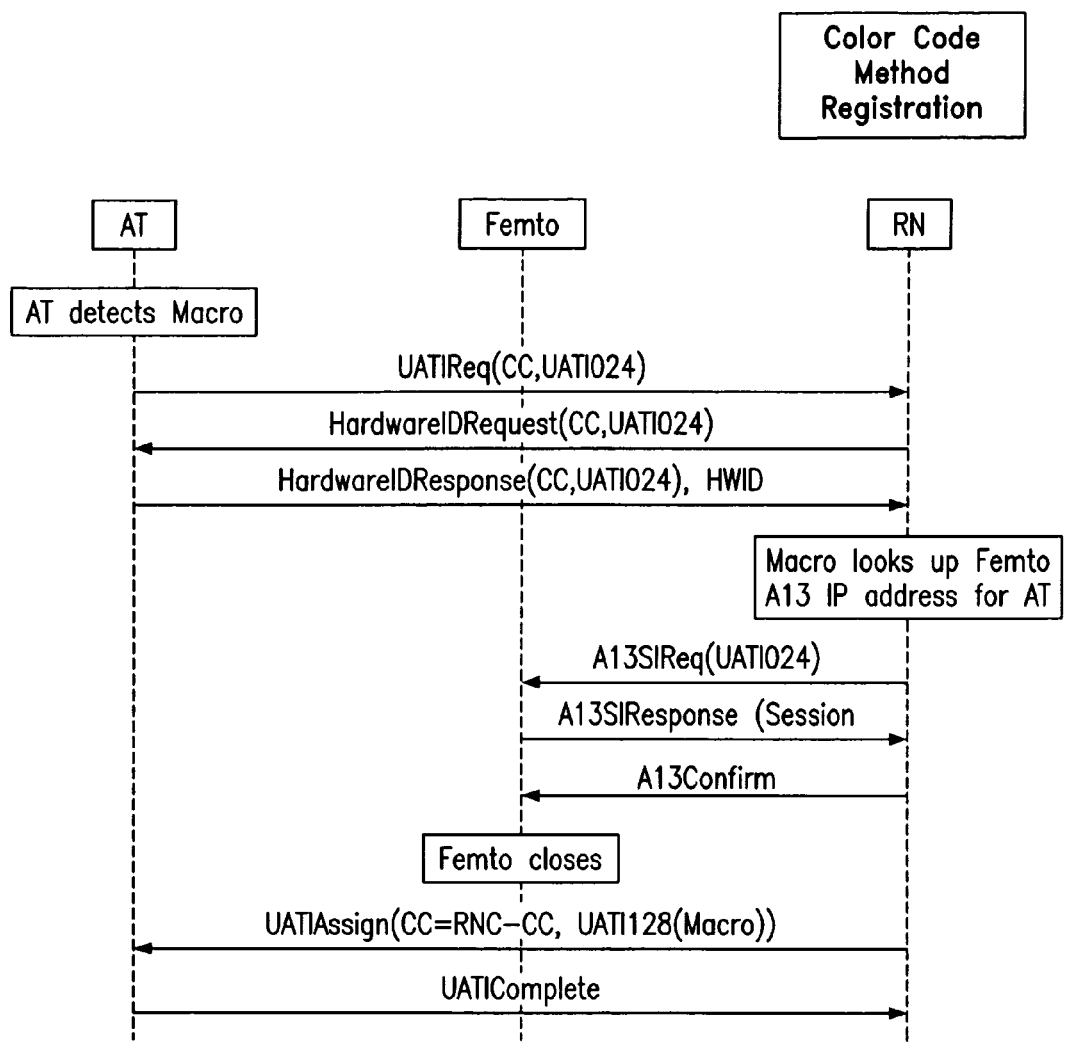
FIG. 7 illustrates a flow diagram for transition 7.

As shown in FIG. 11, this embodiment is the same as the embodiment of FIG. 7 except: (1) the AT and Macro establish a session according to the well-known prior session method, and (2) the Macro determines the IP address of the Femto currently handling the session from the IP address being embedded in the UATI128 of the AT sent during session set up.

Transition 8

As shown in FIG. 12, this embodiment is the same as the embodiment of FIG. 8 except: (1) the AT and Femto establish a session according to the well-known prior session method, and (2) the Femto determines the IP address of the Macro currently handling the session from the IP address being embedded in the UATI128 of the AT sent during session set up.

As an alternative to the prior session embodiments, the ReducedSubnetMask may be employed together with the RNC Grouping organization of the SectorID to inhibit the AT from performing the prior session method in most instances on the Femto/ Macro subnet boundary.

Macro RNC Registration Synchronization

In the course of events, there are some other situations that may need to be addressed, such as when an AT has a session at a Femto, and moves to another Femto where the list of "Local" RNC color codes is different than the first Femto, then it is possible for neighboring RNCs to have a different Femto IP address associated with the hardware ID. If the AT manages to get transition back to the RF area covered by the RNC that has an out-of-sync record of the Femto IP address, then the Color Code transfer may fail. Additionally, there are many "broken" scenarios, in which the AT may interrupt one call flow due to a change in RF conditions, and then start on another scenario, which may also result in some Macro RNCs holding onto stale Femto IP addresses.

This can be resolved in a number of ways. First, if a cluster of Femtos is located in a region where more than one Macro subnet can be seen, then all the Femtos should have the same RNCs in their list of local RNCs to notify. In the case where the AT is turned off and then turned back on in the location of the RNC that has the stale IP address value, or no value at all, the AT may perform a prior session transfer back to the Macro, and, as long as the UATI128 is configured properly and includes the A13 IP address of the Femto that holds the session, the session transfer should succeed.

Within the A13 registration message may be an optional field that allows the sender to indicate all the Color Codes that are being notified of the hardware ID↔Femto A13 IP address association.

Additionally, the Macro system may still have the option of synchronizing its hardware ID↔Femto A13 IP address associations among the neighboring RNCs (both recording and clearing).

Figure 13:
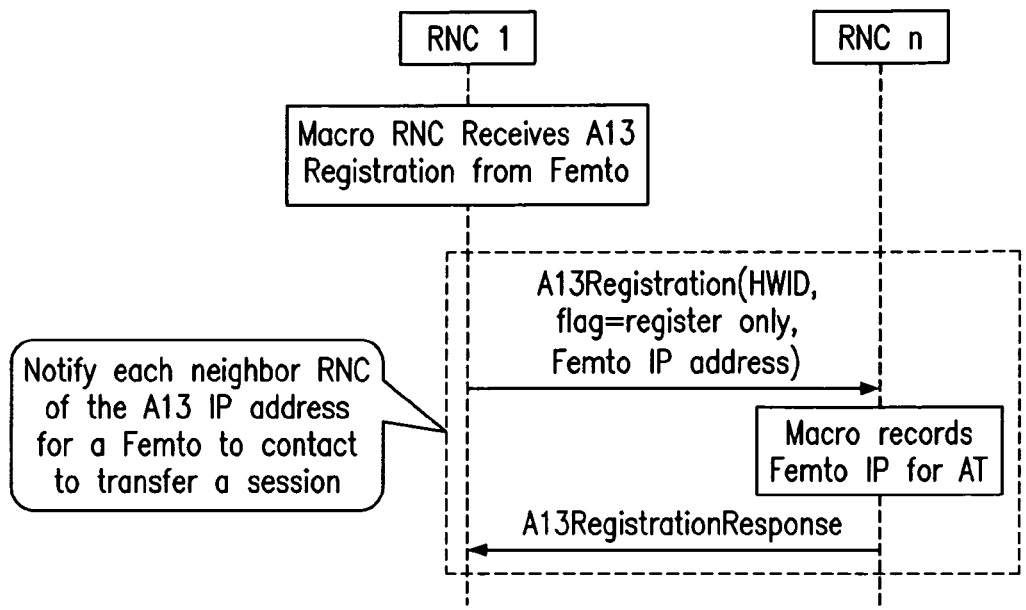
FIG. 13 shows a flow diagram for the case where the RNC that receives an A13 registration may choose to inform other nearby RNCs of the information it has received, if they were not already on the list of color codes in the initial A13 registration message sent from the Femto.

FIG. 13 shows the case where the RNC that receives an A13 registration may choose to inform other nearby RNCs of the information it has received, if they were not already on the list of Color Codes in the initial A13Registration message sent from the Femto.

Figure 14:
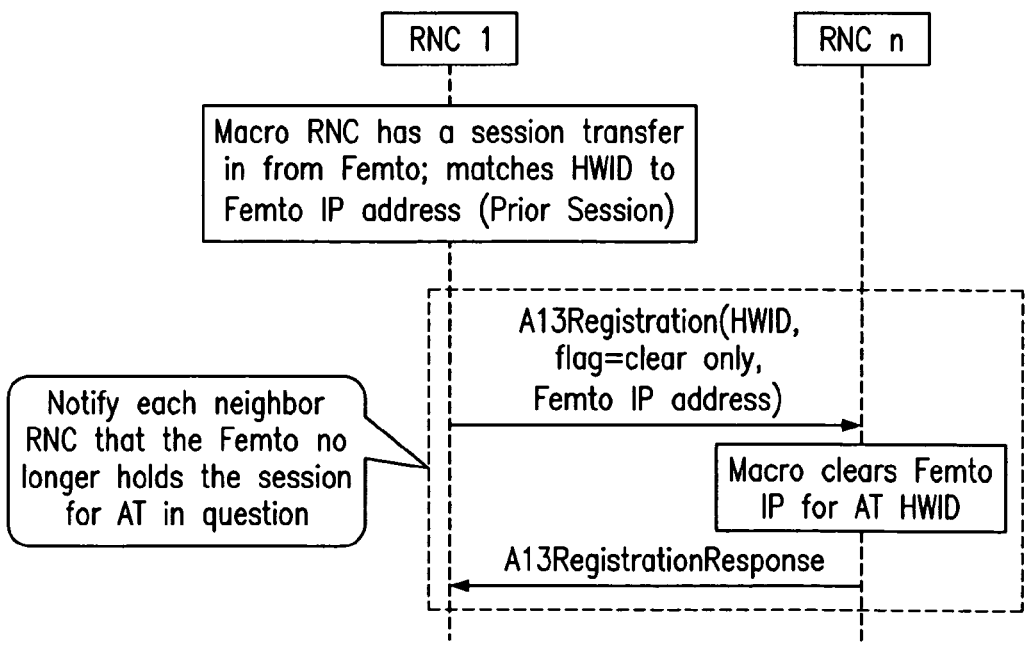
FIG. 14 shows a flow diagram for the case where the RNC that has a session transfer in from a Femto may choose to inform other nearby RNCs of the information it has received, if they were not already on the list of Color Codes in the initial A13 registration message sent from the Femto.

FIG. 14 shows the case where the RNC that has a session transfer in from a Femto may choose to inform other nearby RNCs of the information it has received, if they were not already on the list of Color Codes in the initial A13Registration message sent from the Femto. In the case where the session is transferred back into the Macro using the Prior Session method, the Macro RNC may match the information recorded with the hardware ID to determine if it had a Femto IP address stored.

Other Options

As alluded to above, it should be noted that it is possible to perform some of the functions of the A13 registration and A13 registration response messages with the UATIRequest and UATIAssignment messages by encoding the true purpose of the message into the "Vendor-Specific" fields of these messages. However, if one side of the interchange is not set up to decode the information in the Vendor-Specific fields, it is possible for the message to cause some incorrect actions on the part of the system receiving the message.

Conclusion

The new A13 messages (or modified existing A13 messages) reduce the constant session transfer traffic and allow the Macro RNC to know the IP address of the Femto to contact to either page an AT or to transfer a session. Additional negotiation between each of the inter-vendor partners will still occur to set up the SectorIDs and UATI128 configurations to complete the solution.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

I claim:

1. A method of registering a location of an access terminal within a Femto network with a Macro network, comprising:
sending, by a Femto in the Femto network, a message to the Macro network, the message including a first indicator, a second indicator and an address of the Femto, the first indicator indicating the access terminal, the second indicator indicating to register the Femto address in association with the access terminal, the second indictor indicating to maintain a session of the access terminal with the Macro network if the session is currently handled by the Macro network, the Macro network storing the Femto address in association with an identifier of the access terminal; and
receiving, by the Femto, a registration response message from the Macro network,
the Macro network using the Femto address included in the message to establish another session with the Macro network when the access terminal has left the Macro network and subsequently requests a session transfer after returning to the Macro network.

2. The method of claim 1, wherein the second indicator is a flag in the message.

3. The method of claim 1, wherein the second indicator is a message identifier identifying the message as a registration message.

4. The method of claim 1, wherein the sending is performed in response to a trigger.

5. The method of claim 4, wherein the trigger is receipt of a request for an access terminal identifier from the access terminal.

6. The method of claim 5, further comprising:
receiving, by the Femto, an access terminal identifier in response to the message; and
sending, by the Femto, the access terminal identifier to the access terminal.

7. The method of claim 6, wherein the sending the access terminal identifier further includes sending a color code associated with the Macro network.

8. The method of claim 4, wherein the trigger is transfer of the session for the access terminal to the Femto from another Macro network.

9. The method of claim 4, wherein the trigger is a connection request from the access terminal.

10. The method of claim 4, wherein the trigger is a keep alive request from the access terminal, and the keep alive request requests that the session of the access terminal be maintained.

11. The method of claim 4, wherein the trigger is transfer of the session for the access terminal to the Femto from another Femto.

12. The method of claim 4, further comprising:
receiving, by the Femto, an access terminal identifier in response to the message; and
sending, by the Femto, the access terminal identifier to the access terminal.

13. The method of claim 12, wherein the sending the access terminal identifier further includes sending a color code associated with the Macro network.

14. The method of claim 12, wherein the sending the access terminal identifier further includes sending a color code associated with the Femto.

15. A method of registering a location of an access terminal within a Femto network with a Macro network, comprising:

receiving, at the Macro network, a message from the Femto, the message including a first indicator, a second indicator and an address of the Femto, the first indicator indicating the access terminal, the second indicator indicating to register the Femto address in association with the access terminal, the second indictor indicating to maintain a session of the access terminal with the Macro network if the session is currently handled by the Macro network;

storing, at the Macro network, the Femto address in association with an identifier of the access terminal; and sending, by the Macro network, a registration response message to the Femto, the Macro network using the Femto address included in the message to establish another session with the Macro network when the access terminal has left the Macro network and subsequently requests a session transfer after returning to the Macro network.

16. A Femto, the Femto configured to send a message to a Macro network, the message including a first indicator, a second indicator and an address of the Femto, the first indicator indicating the access terminal, the second indicator indicating to register the Femto address in association with the access terminal, the second indictor indicating to maintain a session of the access terminal with the Macro network if the session is currently handled by the Macro network, the Macro network storing the Femto address in association with an identifier of the access terminal; and receiving, by the Femto, a registration response message from the Macro network, the Macro network using the Femto address included in the message to establish another session with the Macro network when the access terminal has left the Macro network and subsequently requests a session transfer after returning to the Macro network.

\* \* \* \* \*